(12) United States Patent
Barker et al.

(10) Patent No.: US 8,111,991 B2
(45) Date of Patent: *Feb. 7, 2012

(54) N-WAY BROADCAST / NARROWCAST COMBINER

(75) Inventors: Charles Barker, Sunnyvalle, CA (US); Krzysztof Pradzynski, Santa Clara, CA (US)

(73) Assignee: Aurora Networks Inc., Santa Clara, CA (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/890,026

(22) Filed: Aug. 2, 2007

(65) Prior Publication Data

US 2007/0274721 A1 Nov. 29, 2007

Related U.S. Application Data

(63) Continuation of application No. 09/850,935, filed on May 7, 2001, now Pat. No. 7,266,298.

(51) Int. Cl.
*H04J 14/00* (2006.01)
(52) U.S. Cl. .................. 398/66; 398/33; 398/34
(58) Field of Classification Search ............ 398/33, 398/34, 66, 82, 100, 162, 165
See application file for complete search history.

(56) References Cited

U.S. PATENT DOCUMENTS

| | | | |
|---|---|---|---|
| 5,177,628 A | 1/1993 | Moddel | |
| 5,317,198 A | 5/1994 | Husbands | |
| 5,457,562 A | 10/1995 | Tremblay | |
| 5,714,773 A | 2/1998 | Burrows et al. | |

(Continued)

FOREIGN PATENT DOCUMENTS

EP 0546707 11/1992

(Continued)

OTHER PUBLICATIONS

Atlas, et al, Multiwavelength Analog Video Transport Network, MWP'99 Digest, pp. 189-192.

(Continued)

*Primary Examiner* — Dzung Tran
(74) *Attorney, Agent, or Firm* — John Bruckner PC

(57) ABSTRACT

Systems and methods are described for an optiplex. A method includes: conveying a first narrowcast signal to a first optical combiner; conveying a second narrowcast signal to a second optical combiner; tapping into said first narrowcast signal; monitoring a first characteristic of said first narrowcast signal; tapping into said second narrowcast signal; monitoring a second characteristic of said second narrowcast signal; combining a broadcast signal with the first narrowcast signal using the first optical combiner; and combining said broadcast signal with the second narrowcast signal using the second optical combiner. An apparatus includes: a first optical input; an optical splitter connected to said first optical input; a first optical waveguide connected to said optical splitter; a second optical waveguide connected to said optical splitter; a first optical combiner connected to said first optical waveguide; a second optical combiner connected to said second optical waveguide; a second optical input; an optical demultiplexer connected to said second optical input; a third optical waveguide connected to said optical demultiplexer; a fourth optical waveguide connected to said optical demultiplexer; a first tap coupler connected to said third optical waveguide and said first optical combiner; a second tap coupler connected to said forth optical waveguide and said second optical combiner; a first optical signal sensor coupled to both said first tap coupler and a signal processing unit; and a second optical signal sensor coupled to both said second tap coupler and said signal processing unit.

6 Claims, 2 Drawing Sheets

U.S. PATENT DOCUMENTS

| | | | |
|---|---|---|---|
| 5,726,788 | A | 3/1998 | Fee et al. |
| 5,739,933 | A | 4/1998 | Dembeck et al. |
| 5,747,526 | A | 5/1998 | Hollinshead |
| 5,859,719 | A | 1/1999 | Dentai et al. |
| 5,923,450 | A | 7/1999 | Dugan et al. |
| 6,157,475 | A * | 12/2000 | Dugan et al. .................... 398/26 |
| 6,195,362 | B1 | 2/2001 | Darcie et al. |
| 6,271,953 | B1 | 8/2001 | Dishman et al. |
| 6,389,471 | B1 | 5/2002 | Agraharam et al. |
| 6,452,708 | B1 | 9/2002 | Sucharczuk et al. |
| 6,456,851 | B1 | 9/2002 | Sucharczuk et al. |
| 6,498,732 | B2 | 12/2002 | Sucharczuk et al. |
| 6,501,871 | B1 | 12/2002 | Sucharczuk et al. |
| 6,523,916 | B2 | 2/2003 | Sucharczuk et al. |
| 6,577,870 | B2 | 6/2003 | Sucharczuk et al. |
| 6,618,522 | B2 | 9/2003 | Sucharczuk et al. |
| 6,709,284 | B1 | 3/2004 | Avlonitis |
| 6,719,382 | B2 | 4/2004 | Sucharczuk et al. |
| 6,757,493 | B1 | 6/2004 | Sucharczuk et al. |
| 6,760,550 | B2 | 7/2004 | Sucharczuk et al. |
| 6,816,639 | B1 | 11/2004 | Leonczuk et al. |
| 6,847,528 | B2 | 1/2005 | Sucharczuk et al. |
| 6,987,900 | B2 | 1/2006 | Leonczuk et al. |
| 7,266,298 | B2 | 9/2007 | Barker et al. |
| 2002/0024724 | A1 * | 2/2002 | Kosaka .................... 359/337.13 |

FOREIGN PATENT DOCUMENTS

| | | |
|---|---|---|
| EP | 1247358 | 4/2006 |
| WO | WO 01/25455 | 7/2001 |
| WO | WO 02/21737 | 3/2002 |
| WO | WO 02/052911 | 7/2002 |
| WO | WO 03/081302 | 10/2003 |

OTHER PUBLICATIONS

Chen, et al, Experimental Verification of an Evolutionary HFC Network Architecture for Adding Narrowcast Service, Optical Fiber Conference 2000, vol. 2, Mar. 7-10, 2000, pp. 157-159.

Zou, et al, Two Way DWDM Optical Network for Analog and Digital Transmission, 1998, pp. 5-6.

Antec; Promotional Materials, "Laser Link® 8-Channel Red Narrowcast/Broadcast Combiner," Jul. 17, 2000, (2 pages).

Nomura; Promotional Materials, "OCRS-1508 Narrow/ Broadcast Combiner & Distribution Module, " OCRS LLC, 1999, (4 pages).

* cited by examiner

N-WAY BROADCAST / NARROWCAST COMBINER

CROSS-REFERENCE TO RELATED APPLICATION

This application is a continuation of, and claims a benefit of priority under 35 USC 120 from patent application U.S. Ser. No. 09/850,935, filed May 7, 2001, now U.S. Pat. No. 7,266,298, issued Sep. 4, 2007, the entire contents of which are hereby expressly incorporated herein by reference for all purposes.

BACKGROUND OF THE INVENTION

1. Field of the Invention

The invention relates generally to the field of communications. More particularly, the invention relates to optical signal routing and/or distribution. Specifically, a preferred implementation of the invention relates to an optical N-way broadcast/narrowcast combiner.

2. Discussion of the Related Art

In the past, when it was necessary to combine broadcast and narrowcast signals, the passive optical components, for example a demultiplexer, a splitter and a plurality of combiner filters, were all provided in separate enclosures. These separate enclosures were then all interconnected by plugging fiber optic jumpers into a fiber management chassis. One, or more, of the enclosures and/or the chassis might also require a power connection.

A problem with this approach has been that the resulting collection of equipment requires a large number connections including the optical fiber jumpers. Another problem with this approach has been that housing the resulting amalgamation of equipment requires a large volume of space. Typically, the enclosures and the chassis are arranged in rack(s) with the connections draped down between the enclosures.

Another disadvantage of this approach has been relatively high cost. While each of the underlying components within each of the enclosures may be essential to the operation of the system, each of the enclosures represents an unnecessary expense. The mounting equipment within each of the enclosures also represents an additional expense. The fiber optic jumpers are also expensive, as is the rack space to house all of the equipment. Therefore, what is needed is a solution that permits an optical broadcast/narrowcast system to be provided with fewer connectors, while occupying less space and in a more cost-effective manner.

Heretofore, the requirements of fewer connectors, less space and lower cost referred to above have not been fully met. What is needed is a solution that addresses all of these requirements.

SUMMARY OF THE INVENTION

There is a need for the following embodiments. Of course, the invention is not limited to these embodiments.

According to a first aspect of the invention, a method comprises: conveying a first narrowcast signal to a first optical combiner; conveying a second narrowcast signal to a second optical combiner; tapping into said first narrowcast signal; monitoring a first characteristic of said first narrowcast signal; tapping into said second narrowcast signal; monitoring a second characteristic of said second narrowcast signal; combining a broadcast signal with the first narrowcast signal using the first optical combiner; and combining said broadcast signal with the second narrowcast signal using the second optical combiner. According to a second aspect of the invention, an apparatus comprises: a first optical input; an optical splitter connected to said first optical input; a first optical waveguide connected to said optical splitter; a second optical waveguide connected to said optical splitter; a first optical combiner connected to said first optical waveguide; a second optical combiner connected to said second optical waveguide; a second optical input; an optical demultiplexer connected to said second optical input; a third optical waveguide connected to said optical demultiplexer; a fourth optical waveguide connected to said optical demultiplexer; a first tap coupler connected to said third optical waveguide and said first optical combiner; a second tap coupler connected to said forth optical waveguide and said second optical combiner; a first optical signal sensor coupled to both said first tap coupler and a signal processing unit; and a second optical signal sensor coupled to both said second tap coupler and said signal processing unit.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The context of the invention can include a communications network. The context of the invention can also include optical signal switching and/or routing and/or distribution. The context of the invention can also include optical signal combining and/or multiplexing and/or decombining and/or demultiplexing.

The invention can include an optical N-way broadcast/narrowcast combiner. Such a combiner can be termed an optiplex.

The invention can include diagnostic functionalities. These diagnostic functionalities can be based on, for example, tap couplers and optical sensors. The diagnostic functionalities can be integrated with the combiner via associated microprocessor(s).

The invention can include control functionalities. These control functionalities can be based on, for example, variable optical attenuators. The control functionalities can be integrated with the combiner via associated microprocessor(s).

Figure 1:
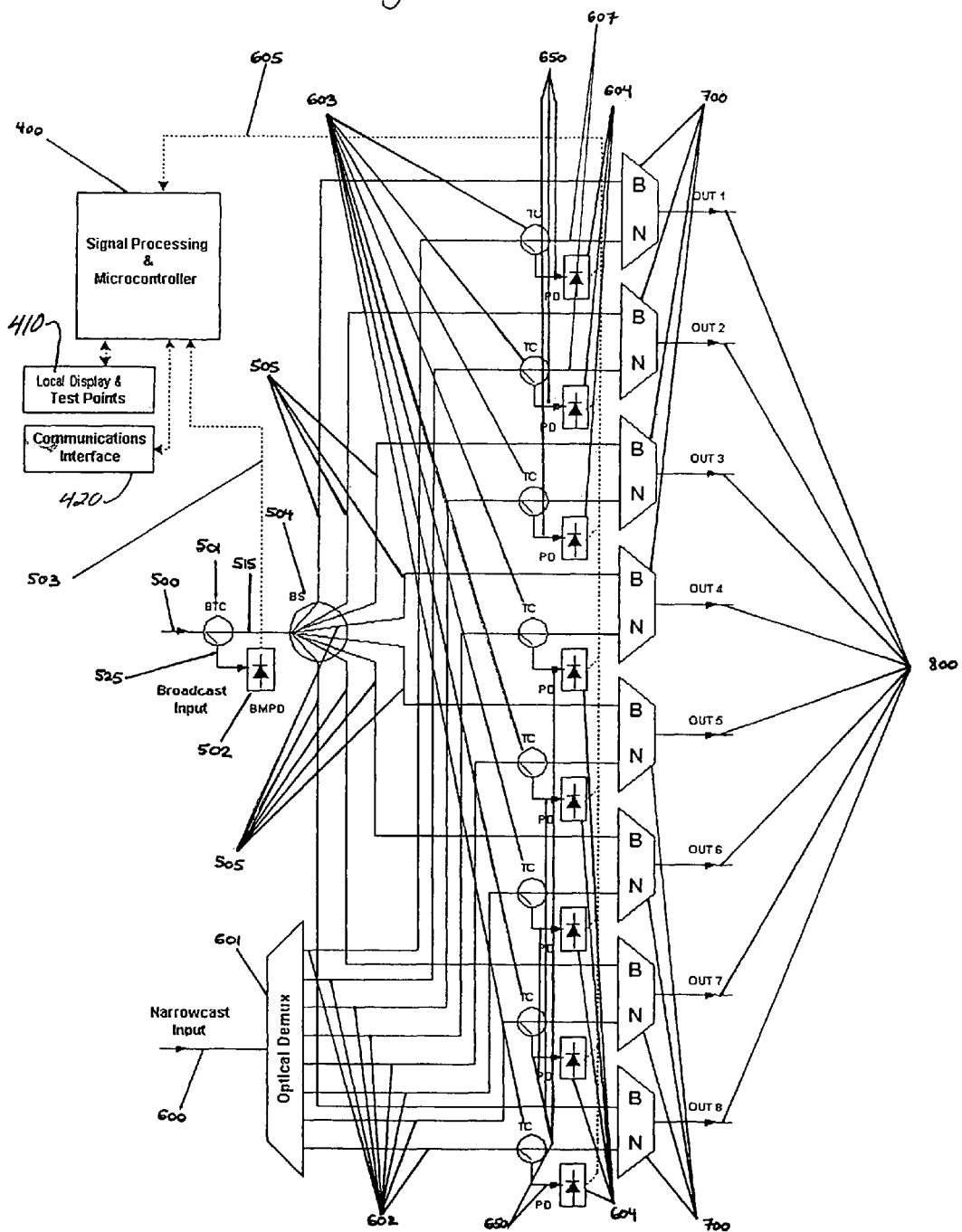
FIG. 1 illustrates a circuit schematic view of an 8-way optiplex with integral diagnostics, representing an embodiment of the invention.

Referring to FIG. 1, an 8-way optiplex is shown. Two optical signals, a broadcast signal, and a multiplexed narrowcast signal can be introduced as inputs to the system. Both inputs may be carried to the system via optical signal carriers. The optical signal carriers may include, but are not limited to planar waveguides, single mode optical fibers, multi mode optical fibers, and photonic optical fibers.

A broadcast optical input 500 is coupled to an optical tap coupler 501. The optical tap coupler 501 is coupled to both a broadcast monitor photodiode 502 and a 1*N optical broadcast splitter 504. The broadcast optical splitter 504 may be connected to the tap coupler 501 via optical signal carrier 515 and the broadcast monitor photodiode 502 may be connected to the optical tap coupler 501 via optical signal carrier 525. The optical signal carriers described herein may comprise, but are not limited to, a planar waveguide, single mode optical fiber, multi mode optical fiber, and/or photonic optical fiber. The broadcast monitor photodiode 502 is coupled to a broadcast signal monitor input of a signal processing unit 400 via a bus 503. The signal processing unit 400 includes a digital signal processor and as microcontroller. The optical broadcast splitter 504 is coupled to the broadcast signal input terminal of N (where N≧2) three-port optical combiners 700 via N optical signal carriers 505.

A multiplexed narrowcast optical input 600 can convey N (where N≧2) multiplexed narrowcast optical signals. The narrowcast optical input 600 is coupled to an optical wavelength division demultiplexer 601 via a optical signal carrier. The optical wavelength division demultiplexer 601 is coupled to N optical tap couplers 603, via N optical signal carriers 602. Each of the optical tap couplers 603 are coupled to both a narrowcast monitor photodiode 604, and the narrowcast signal input terminal of an associated three-port optical combiner 700. The optical tap couplers 603 may be connected to the narrowcast monitor photodiodes 604 via optical signal carriers 650, and to the narrowcast signal input terminal of the optical combiners 700 via optical signal carriers 607. The narrowcast monitor photodiodes 604 are coupled to the narrowcast signal monitor input of the signal processing unit 400 via a bus 605. Each of the N three-port optical combiners 700 includes an optical filter device that has passbands that are specific to the broadcast and narrowcast wavelengths used. The optical combiners 700 can be tuned to give the desired combined outputs 800. The N combined outputs 800 can be coupled to external devices (not shown).

A local display and test points module 410 is coupled to the signal processing unit 400. A communications interface 420 is also coupled to the signal processing unit 400.

It can be readily appreciated that there are two inputs to the system, the broadcast input 500 and the N-way optically multiplexed narrowcast input 600. As the broadcast input 500 passes through the optical tap coupler 501, a small amount of the broadcast input signal is split off and directed towards the diagnostic photodiode 502. The diagnostic photodiode 502 sends a function of the broadcast input signal to the signal processing unit 400 via the bus 503. The remainder of the broadcast input signal is split into N broadcast outputs by the optical splitter 504.

The N-way optically multiplexed narrowcast input 600 passes through an optical demultiplexer 601, where it is separated into N demultiplexed narrowcast signals. Each of the demultiplexed narrowcast optical signals then passes through one of N tap couplers 603 which in-turn splits off a small amount of the narrowest optical signal to a one of N diagnostic photodiodes 604. Each diagnostic photodiode 604 conveys a signal that is a function of its input to the signal processing unit 400 via the bus 605. The remainder of each demultiplexed narrowcast signal 607 is directed to a one of the N optical combiners 700, each of which optically combines the split broadcast output with a one of N narrowcast outputs. Each optical combiner 700 outputs a multicast optical signal 800.

Figure 2:
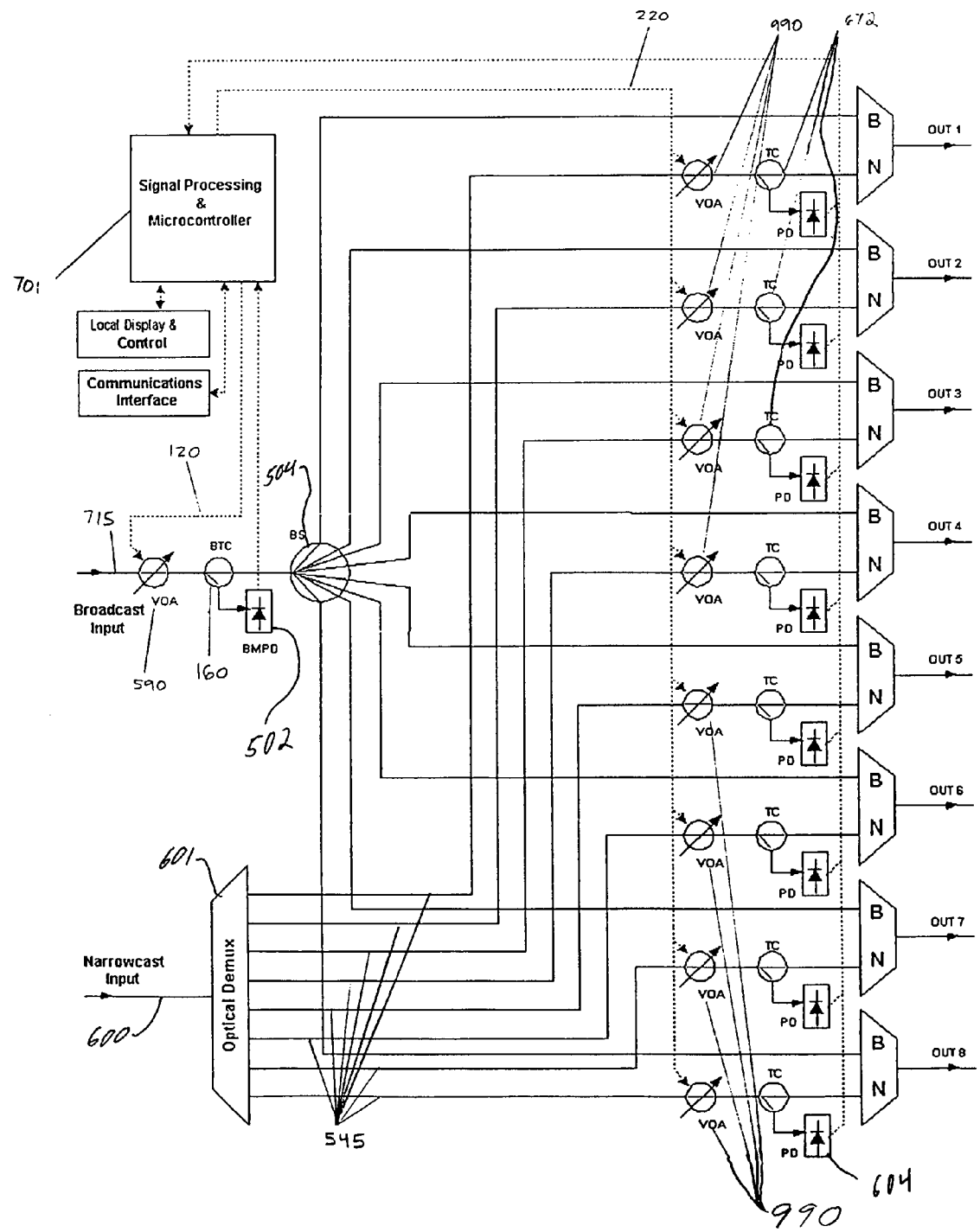
FIG. 2 illustrates a circuit schematic view of an 8-way optiplex with integral diagnostic and optical level control, representing an embodiment of the invention.

Referring to FIG. 2, an 8-way optiplex is shown with the addition of optical level controls for both broadcast and narrowcast signals. A broadcast input 715 is coupled to a variable optical attenuator 590 via an optical signal carrier. The variable optical attenuator 590, via a bus 120, to a broadcast signal attenuation control output of a signal processing unit 701. The variable optical attenuator 590 is also coupled to a tap coupler 160.

The narrowcast input 600 is coupled to the optical demultiplexer 601 from which N demultiplexed narrowcast optical signals (where N≧2) are each coupled to a one of N variable optical attenuators 990 via optical signal carriers 545. A narrowcast signal attenuation control output of the signal processing unit 701 is also coupled to each of the variable optical attenuators 990, via a bus 220. Each variable optical attenuator 990 is coupled to one of N tap couplers 672.

This system utilizes the signal processing unit 701 to condition the broadcast signal and the demultiplexed narrowcast signals which are combined to form N (where N≧2) multicast outputs. Signal characteristics of the broadcast input may be altered using the variable optical attenuator 590, which is controlled via the bus 120 by the signal processing unit 701. Signal characteristics of each demultiplexed narrowcast signal may be altered using the variable optical attenuator 990 serially connected to each demultiplexed narrowcast signal. Each variable optical attenuator 990 may be individually controlled, via the bus 220, by the signal processing unit 701

The inputs are an optical signal carrying broadcast content and an optically multiplexed set of optical signals carrying narrowcast content. The broadcast optical signal passes through the variable optical attenuator (VOA) 590 whose transmission can be controlled by a local or remote microcontroller to set the overall broadcast optical signal power at the output ports of the optiplex, an optical tap coupler 160 (BTC) that splits off a small amount of light (nominally 1%) and directs it to the photodiode 502 (BMPD) that is used by the microcontroller 701 to measure the broadcast optical signal power level, and a 1×N optical splitter 504 (BS) where N≧2. Although the figures show these elements in a particular order, these elements can be arranged in other configurations to accomplish the same functions.

Each of the output legs of the broadcast splitter (BS) is directed to a wideband optical combiner 700 (BN), whose two input ports pass certain optical wavelength bands to the output port 800 with low attenuation. Although not shown, a finer level of control over the broadcast optical signal power at each optiplex output port may be attained by placing a variable optical attenuator, tap coupler, and diagnostic photodiode in each output leg of the broadcast optical splitter prior to the wideband optical combiner (BN).

The narrowcast input conveys a set of N (where N≧2) optical signals with distinct wavelengths that have been optically multiplexed onto a single optical signal carrier that connects to the optiplex at the narrowcast input port. The multiplexed set of narrowcast optical signals passes through the optical wavelength division demultiplexer that separates the signals by wavelength. Each of the narrowcast optical signals then passes through a variable optical attenuator (VOA) that is controlled by a microcontroller and a tap coupler (TC) that splits a small amount of optical signal and directs it to a diagnostic photodiode (PD). The photodiode output and the variable optical attenuator allow the microcontroller to adjust the power of the narrowcast signal relative to the broadcast optical signal power to maintain a specified power ratio between the two optical signals. The adjustment of the relative optical power levels is desirable to optimize the communication performance at a receiver (not shown) since the broadcast and narrowcast content may be transported with different modulation formats. An optical signal emerges from each of the output parts, which signal is a wavelength division multiplexed combination of the broadcast optical signal and one of the narrowcast optical signals.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The invention can also utilize data processing methods that transform signals from the communications interface 420 to adjust and/or control the optiplex. For example, the invention can be combined with instrumentation to obtain state variable information to actuate interconnected discrete hardware elements. For instance, the invention can include the use of a transient event analyzer to control the relative signal strengths.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

The particular manufacturing process used for combining the components of the optiplex should be inexpensive and reproducible. Conveniently, the assembly of the optiplex can be carried out by using any optical connector joining method. It is preferred that the process be precise and accurate. For the manufacturing operation, it is an advantage to employ an automated technique.

However, the particular manufacturing process used for combining the components of the optiplex is not essential to the invention as long as it provides the described functionality. Normally those who make or use the invention will select the manufacturing process based upon tooling and energy requirements, the expected application requirements of the final product, and the demands of the overall manufacturing process.

The disclosed embodiments show a tap coupler as the structure for performing the function of diverting a portion of a signal for diagnosis, but the structure for diverting a portion of the signal can be any other structure capable of performing the function of diverting a portion of a signal for diagnosis, including, by way of example a beamsplitter.

While not being limited to any particular performance indicator or diagnostic identifier, preferred embodiments of the invention can be identified one at a time by testing for the presence of stable and even response between the output channels. The test for the presence of stable and even response can be carried out without undue experimentation by the use of a simple and conventional data recordation experiment.

PRACTICAL APPLICATIONS OF THE INVENTION

A practical application of the invention that has value within the technological arts is to combine a fanned-out optical broadcast signal (e.g., mass market entertainment) with any one of several wave-division-demultiplexed optical narrowcast signals (e.g., bidirectional packets). The invention is useful in maintaining a desired power ratio between narrowcast and broadcast signals. There are virtually innumerable uses for the invention, all of which need not be detailed here.

ADVANTAGES OF THE INVENTION

A broadcast/narrowcast combiner, representing an embodiment of the invention, can be cost effective and advantageous for at least the following reasons. The invention permits a broadcast/narrowcast optical system to be assembled with fewer connectors. The invention permits a broadcast/narrowcast optical system to be assembled within a much smaller space, thereby achieving optimum packaging density. The integrated diagnostics permit information from multiple output ports to be collected simultaneously. The embedded photodiodes also eliminate the need for an optical spectrum analyzer. The feedback from the diagnostic photodiodes enables the microcontroller to control the various signal power levels using variable optical attenuators. The variable optical attenuators also give the network operator an automatic and/or remote control capability. The invention enables the signals from both the narrowcast and broadcast inputs to be regulated simultaneously. The invention reduces costs and improves efficiency compared to previous approaches.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials. Further, variation may be made in the steps or in the sequence of steps composing methods described herein.

Further, although the combiner described herein can be a separate module, it will be manifest that the combiner may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   demultiplexing a multiplexed narrowcast input signal into a first narrowcast signal and a second narrowcast signal;
   conveying said first narrowcast signal to a first optical combiner;
   conveying said second narrowcast signal to a second optical combiner;
   tapping into said first narrowcast signal;
   monitoring a first characteristic of said first narrowcast signal;
   tapping into said second narrowcast signal;
   monitoring a second characteristic of said second narrowcast signal;
   tapping into a broadcast signal;
   monitoring a third characteristic of said broadcast signal;
   attenuating a power of said broadcast signal as a function of said third characteristic;
   combining said broadcast signal with the first narrowcast signal using the first optical combiner to give a first combined optical port output; and
   combining said broadcast signal with the second narrowcast signal using the second optical combiner to give a second combined optical port output.

2. The method of claim 1, wherein
   demultiplexing said multiplexed narrowcast input signal into said first narrowcast signal and said second narrowcast signal includes demultiplexing using an optical wavelength division demultiplexer.

3. The method of claim 1, further comprising:
   adjusting a first power of said first narrowcast signal as a function of said first characteristic; and
   adjusting a second power of said second narrowcast signal as a function of said second characteristic.

4. An apparatus, comprising:
   a first optical input;
   an optical splitter connected to said first optical input;
   a first optical waveguide connected to said optical splitter;
   a second optical waveguide connected to said optical splitter;
   a first optical combiner connected to said first optical waveguide, said first optical combiner giving a first combined optical port output;
   a second optical combiner connected to said second optical waveguide, said second optical combiner giving a second combined optical port output;
   a second optical input;
   an optical demultiplexer connected to said second optical input, the optical demultiplexer demultiplexing a multiplexed narrowcast input signal into a first narrowcast signal and a second narrowcast signal;
   a third optical waveguide connected to said optical demultiplexer;
   a fourth optical waveguide connected to said optical demultiplexer;
   a first tap coupler connected to said third optical waveguide and said first optical combiner;
   a second tap coupler connected to said forth optical waveguide and said second optical combiner;
   a first optical signal sensor coupled to both said first tap coupler and a signal processing unit;
   a second optical signal sensor coupled to both said second tap coupler and said signal processing unit;
   a third tap coupler connected between said first optical input and said optical splitter, wherein said first optical input is a broadcast input;
   a third optical signal sensor coupled to both said third tap coupler and said signal processing unit; and
   a variable optical attenuator coupled between said broadcast input and said third tap coupler.

5. The apparatus of claim 4, further comprising said signal processing unit and a communication interface coupled to said signal processing unit.

6. The apparatus of claim 4, wherein said demultiplexer includes an optical wavelength division demultiplexer.

* * * * *